Feb. 17, 1931.   J. WEBER ET AL   1,792,668
PROCESS OF AND APPARATUS FOR PRODUCING ALKYL OXIDES
Filed March 2, 1928
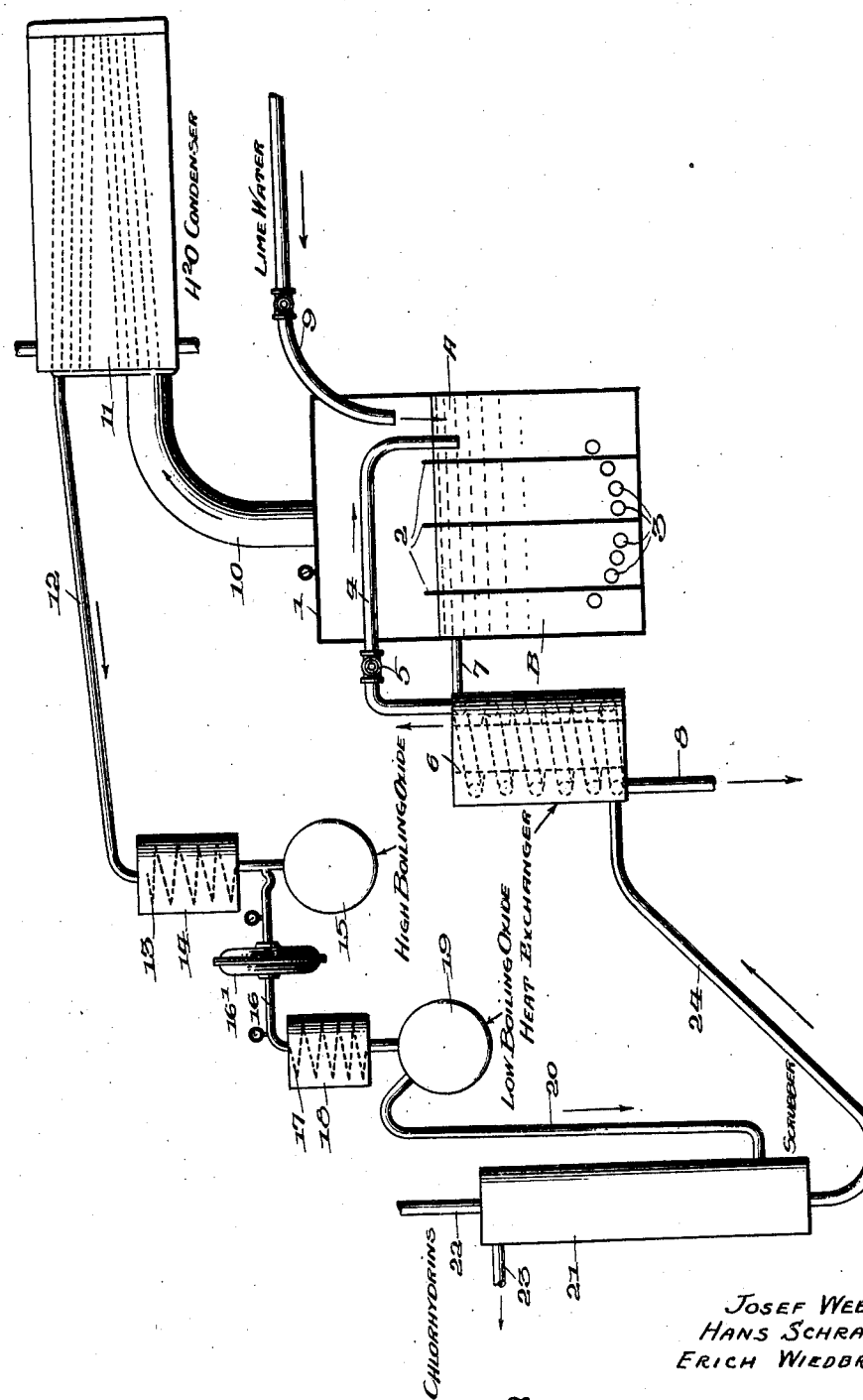
Inventors,
JOSEF WEBER,
HANS SCHRADER,
ERICH WIEDBRAUCK,
By Charles F. Dane
Attorney Patented Feb. 17, 1931

1,792,668

UNITED STATES PATENT OFFICE

JOSEF WEBER AND HANS SCHRADER, OF ESSEN-RUHR, AND ERICH WIEDBRAUCK, OF AMMENDORF, GERMANY, ASSIGNORS TO THE FIRM OF TH. GOLDSCHMIDT A.-G., OF ESSEN-RUHR, GERMANY

PROCESS OF AND APPARATUS FOR PRODUCING ALKYL OXIDES

Application filed March 2, 1928, Serial No. 258,661, and in Germany July 11, 1927.

This invention relates to the production of alkyl oxides; and it comprises a process of and apparatus for producing alkyl oxides from alkyl chlorhydrins in good yield, wherein a boiling body of liquid is established and maintained; the said boiling liquid flowing past baffle members in a distilling chamber and thence in heat exchanging relationship to inflowing fresh liquid; supplying alkali and chlorhydrin to said boiling liquid at a point remote from its point of exit, passing evolved vapors through a reflux condenser and finally fractionally condensing the several olefin oxides from the uncondensed vapors of such oxides; and it also comprises certain organizations of apparatus elements adapted for the performance of the described process; all as more fully hereinafter set forth and as claimed.

While the manufacture of oxides of the gaseous olefins from the corresponding chlorhydrins is simple in principle, since any alkali will abstract H and Cl from a chlorhydrin to make an oxide, in practice it is extremely difficult to perform the reaction with satisfactory yields. The olefin oxides are extremely reactive bodies and if given any opportunity they are apt to polymerize, to condense with chlorhydrin, to hydrolyze with production of glycols, etc. It is an object of the present invention to produce the oxides in vapor form as quickly as possible and immediately remove them from the sphere of reaction. And in practice it is best to work at temperatures near or at the boiling point, under whatever pressure may prevail, to effect this rapid removal and to minimize polymerization, condensation, etc., and it is best to so perform the operation as to prevent mass action; that is, the occurrence of any substantial excess of either alkali or chlorhydrin in the zone of reaction. The operation is one for which the exact control of conditions afforded by continuous operation is desirable; but it is one in which batch action is usually resorted to. We have found that the difficulties attendant on continuous operation are much more easily overcome than those attendant on the usual batch or discontinuous operation. There are the further advantages that smaller apparatus is required, there is less waste of reagents, less loss of material and better yields of purer material may be attained. Further, the operation readily lends itself to the isolation of the several oxides. Gases containing mixed olefins, such as oil gas, give mixed chlorhydrins and these are difficult to separate. But the oxides given by the chlorhydrins can be separated and the separated oxides then reconverted into pure chlorhydrins, if these be desired. Olefin oxides are extremely reactive bodies and can be readily converted into any olefin derivative desired.

In the accompanying illustration there is shown, more or less diagrammatically, certain organizations of apparatus within the purview of the present invention and useful in the performance of the described process. The showing is in central vertical section, certain parts being in elevation. In the showing, Element 1 is a reaction and distillation vessel which may be made of any convenient material, such as stoneware or other ceramic material, etc. In its interior, it is divided into a number of successive compartments by baffles 2, forming a circuitous passage for liquid. In each of the chambers formed by the baffles are steam pipes 3. Hot chlorhydrin solution is introduced into the reaction chamber through pipe line 4 valved at 5; introduction being into one of the sub-chambers formed by the baffle walls. This sub-chamber is indicated as A. The chlorhydrin solution entering passes through heat exchanger 6, through which passes in counter-flow hot exhausted solution from the reaction chamber. This exhausted solution comes through pipe 7, withdrawing solution from sub-chamber B, which is remote from sub-chamber A. The exhausted solution goes to exit from the heat exchanger through pipe 8. Returning to the reaction vessel, into sub-chamber A, a flow of alkali solution, such as milk of lime, is introduced by valved pipe 9 entering the top of the chamber. The flow of alkali and of chlorhydrin to the zone of reaction is continuous; giving high effective capacity but no large amount of either is in the system at any one moment. As the flows of chlorhydrin and of alkali are introduced into A, they react and, at the temperature prevailing, all the alkyl oxides formed are converted into vapor and pass into the vapor space of the chamber together with considerable water vapor. The liquid in the chamber is forced to flow in a circuitous path by the baffles 2 and in its passage is stripped of any dissolved alkyl oxides. In passing to waste through 7, the liquor gives up its heat to the incoming chlorhydrin solution, thereby lessening the heating duty imposed on the steam pipes. The vapors of alkyl oxides, together with water vapor, pass upward through vapor line 10 into a reflux condenser of precooler 11 where the water vapor is condensed. Water runs back into the reaction chamber, where any co-condensed alkyl oxides are again vaporized. It is necessary that a good removal of aqueous vapor be effected in 11 to avoid clogging of subsequent condensers where low temperatures are used; these temperatures often being below 0° C. Ethylene oxide boils at 13.5° C. and low temperatures are required in its condensation, particularly where the vapor is dilute or the system operates under reduced pressure. The vapors of the alkyl oxides leave the precooler or reflux condenser through conduit 12 and pass through a succession of water jacketed condensers, each maintained at an appropriate temperature for the condensation of a particular alkyl oxide. The first of these condensers consists of a pipe 13 in a cooling tank 14 maintained at a temperature around 8° to 10° C. There the propylene oxide is condensed and the liquid is trapped off vapor line 16 and collected in tank 15. Uncondensed vapors go forward through 16 into a similar cooled condenser pipe 17 in cooling vessel 18, maintained at a very low temperature to condense ethylene oxide. It is advantageous to intercalate a pump 16' between 15 and 16, thereby allowing the use of reduced pressure in producing the oxides in reaction chamber 1 and a higher pressure in the ethylene oxide condenser. The vapors are compressed after passing the pump and are consequently more easily condensed. The boiling point of ethylene oxide is lowered under reduced pressure and much lower temperatures are required in cooling coils to give efficient condensation in this case especially when the oxide vapors contain any foreign gases. Cooling with refrigerated brine is ordinarily used. Liquefied ethylene oxide is collected in tank 19. Foreign gases and any uncondensed ethylene oxide vapor go forward through outlet pipe 20 into scrubbing tower 21 into and through which chlorhydrin solution to be treated is passed by means of pipe 22. Permanent gases which may be in the system go to exit through outlet 23, while ethylene oxide vapors are taken up by the chlorhydrin solution which serves as a scrubbing liquid. The solution leaves the base of the tower through pipe 24 and goes through the heat exchanger already described.

While ordinary atmospheric pressure may prevail in the reaction vessel, it is found in practice that it is better to use sub-atmospheric pressures. In practice sufficient reduction of pressure to cause the liquid to boil at about 80° C. has been found advantageous.

The several alkylene oxides collected can be afterwards purified by fractionation in the usual ways.

What is claimed is:—

1. The process of making olefin oxide from the corresponding chlorhydrins which comprises establishing and maintaining a slowly flowing body of boiling aqueous liquid having an extensive surface and supplying corresponding quantities of chlorhydrin solution and of alkali thereto at a point near the beginning of flow and collecting and condensing the evolved olefin oxide vapors.

2. The process of making olefin oxides from the corresponding chlorhydrins which comprises establishing and maintaining a slowly flowing body of boiling aqueous liquid having an extensive surface and under sub-atmospheric pressure, and supplying corresponding quantities of chlorhydrin solution and of alkali thereto at a point near the beginning of flow and collecting and condensing the evolved olefin oxide vapors.

3. The process of making pure olefin oxides from mixed chlorhydrins which comprises establishing and maintaining a slowly flowing body of boiling aqueous liquid having an extensive surface and supplying corresponding quantities of chlorhydrin solution and of alkali thereto at adjacent points near the beginning of flow and collecting and fractionally condensing the evolved olefin oxide vapors.

4. In the manufacture of olefin oxides from the corresponding chlorhydrins, the process which comprises establishing and maintaining a slowly flowing body of boiling aqueous liquid having an extensive surface and leading chlorhydrin solution and alkali solution in corresponding amounts to the same at adjacent points of the surface of the body of liquid, collecting the vapors produced, refluxing water vapors therein contained and passing the oxide vapors thereby precooled and dried to a low temperature condenser.

5. In the manufacture of pure olefin oxides from mixed chlorhydrins, the process which comprises establishing and maintaining a slowly flowing body of boiling aqueous liquid having an extensive surface and leading chlorhydrin solution in corresponding amounts and alkali solution to the same at adjacent points of the surface of the body of liquid, collecting the vapors produced, refluxing water vapors therein contained and passing the oxide vapors thereby precooled and dried to a series of condensers maintained at different low temperatures to fractionally condense the several oxides.

6. In the manufacture of alkylene oxides from the corresponding chlorhydrins, the process which comprises forming vapors of said oxides by the action of alkali on a boiling chlorhydrin solution, compressing said vapors and condensing under increased pressure.

7. The process of making olefin oxides from the corresponding chlorhydrins, which comprises establishing and maintaining a slowly flowing body of boiling aqueous liquid having an extensive surface and supplying corresponding quantities of chlorhydrin solution and of alkali thereto at adjacent points near the beginning of flow and collecting and condensing the evolved olefin oxide vapors, inflowing chlorhydrin solution being heated at the expense of outflowing liquid coming from said body.

8. In apparatus for manufacturing olefin oxides from chlorhydrins, a still body having a baffled, relatively long flow passage therein, means for introducing chlorhydrin solution into the still body at a point near the beginning of flow, means for introducing alkali solution at an adjacent point, reflux means for condensing and returning water to the still body, fractional condensing means receiving precooled and dried vapors from the reflux condensing means, means for establishing temperatures of about 0° C. in the final condenser, and means for producing reduced pressure in the still body and a higher pressure in said final condenser.

9. In apparatus for manufacturing olefin oxides from chlorhydrins, a still body having a baffled, relatively long flow passage therein, means for introducing chlorhydrin solution into the still body at a point near the beginning of flow, means for introducing alkali solution at an adjacent point, means for removing liquid at the other end of the body, means for exchanging the heat of the removed liquid with inflowing chlorhydrin solution, reflux means for condensing and returning water to the still body, fractional condensing means receiving precooled and dried vapors from the reflux condensing means, and means for establishing temperatures of about 0° C. in the final condenser.

10. In apparatus for manufacturing olefin oxides from chlorhydrins, a still body having a baffled, relatively long flow passage therein, means for introducing chlorhydrin solution into the still body at a point near the beginning of flow, means for introducing alkali solution at an adjacent point, means for removing liquid at the other end of the body, means for exchanging the heat of the removed liquid with inflowing chlorhydrin solution, reflux means for condensing and returning water to the still body, fractional condensing means receiving precooled and dried vapors from the reflux condensing means, means for establishing temperatures of about 0° C. in the final condenser and means for scrubbing effluent gases coming from the final condenser by the chlorhydrin solution flowing to the heat exchanger.

In testimony whereof we affix our signatures.

JOSEF WEBER.
HANS SCHRADER.
ERICH WIEDBRAUCK.